US005442652A

United States Patent [19]

Jacobson

[11] Patent Number: 5,442,652

[45] Date of Patent: Aug. 15, 1995

[54] BROADCAST SYNCHRONIZED COMMUNICATION SYSTEM

[75] Inventor: Allen G. Jacobson, Ramsey, N.J.

[73] Assignee: InterDigital Technology Corp., Wilmington, Del.

[21] Appl. No.: 188,324

[22] Filed: Jan. 25, 1994

Related U.S. Application Data

[62] Division of Ser. No. 704,440, May 23, 1991, Pat. No. 5,289,497.

[51] Int. Cl.[6] .................... H04L 27/30; H04L 9/12

[52] U.S. Cl. .................... 375/200; 380/33

[58] Field of Search .................... 375/1, 106–108; 370/100.1, 104.1, 105.2, 105.4, 105.5, 107; 380/9, 33, 34; 342/387

[56] References Cited

U.S. PATENT DOCUMENTS

| | | | |
|---|---|---|---|
| 3,879,581 | 4/1975 | Schlosser et al. | 370/104.1 |
| 4,066,964 | 1/1978 | Costanza et al. | 375/1 |
| 4,115,661 | 9/1978 | Schmidt | 370/95.3 |
| 4,201,892 | 5/1980 | Schmidt | 370/104 |
| 4,349,915 | 9/1982 | Costas | 375/40 |
| 4,397,019 | 8/1983 | Alvarez et al. | 370/104 |
| 4,454,604 | 6/1984 | Myers | 375/1 |
| 4,554,668 | 11/1985 | Demon et al. | 375/1 |
| 4,555,707 | 11/1985 | Connelly | 342/387 |
| 4,613,979 | 9/1986 | Kent | 375/108 |
| 4,688,251 | 8/1987 | Citron et al. | 375/1 |
| 4,759,016 | 7/1988 | Otsuka | 375/95 |
| 4,763,325 | 8/1988 | Wolfe et al. | 370/104 |
| 4,768,251 | 8/1988 | Conklin et al. | 375/107 |
| 4,796,260 | 1/1989 | Schilling et al. | 371/39 |
| 4,812,852 | 3/1989 | Bent et al. | 342/387 |
| 4,847,842 | 7/1989 | Schilling et al. | 371/37 |
| 4,849,974 | 7/1989 | Schilling et al. | 371/37 |
| 4,849,976 | 7/1989 | Schilling et al. | 371/39 |
| 4,888,769 | 12/1989 | Deal | 370/50 |
| 4,941,150 | 7/1990 | Iwasaki | 375/1 |
| 4,984,247 | 1/1991 | Kaufmann et al. | 375/1 |
| 5,001,730 | 3/1991 | Franaszek et al. | 375/107 |
| 5,068,916 | 11/1991 | Harrison et al. | 375/107 |
| 5,084,900 | 1/1992 | Taylor | 375/1 |
| 5,113,443 | 5/1992 | Brockman | 375/1 |
| 5,117,424 | 5/1992 | Cohen et al. | 370/107 |
| 5,140,610 | 8/1992 | Holliday et al. | 375/1 |
| 5,289,497 | 2/1994 | Jacobson et al. | 375/1 |

*Primary Examiner*—Salvatore Cangialosi
*Attorney, Agent, or Firm*—David Newman & Associates

[57] ABSTRACT

A communication system in accordance with the invention employs a broadcast signal for synchronization of the transmitters and receivers in the system without use of a special base transmitter for synchronizing signal transmissions. Each transmitter having a pre-assigned time slot counts from a synchronizing index which is inherent in or added to the broadcast signal to determine when to transmit. The receiver of receivers similarly count from the synchronizing index to determine when to look for specific time slice transmissions.

6 Claims, 5 Drawing Sheets

BROADCAST SYNCHRONIZED COMMUNICATION SYSTEM

This application is a divisional of Ser. No. 07/704,440 filed May 23, 1991, now U.S. Pat. No. 5,289,487.

BACKGROUND OF THE INVENTION

The present invention relates generally to the field of communications systems and more specifically to asymmetrical communication systems using a high data rate (wide data bandwidth) in one direction and a low data rate (narrow data bandwidth) for the return direction. The asymmetry lies in the relative data rates or amount of information flowing between two individual stations rather than a reference to the actual spectrum (bandwidth) of the transmissions. The principles of the present invention may however be extended to other communication environments including single direction and symmetrical two direction communication channels and to other fields requiring synchronization of remote communication equipment.

Systems in which relatively broadband information is transmitted to numerous users from a base and narrow band information from each user back to the base are known. For example, data is transmitted in an otherwise unused portion of a broadcast FM or TV signal and the users respond via dedicated telephone lines.

In the embodiments described below, time division (TD), particularly time division multiple access (TDMA), and spread spectrum (SS) transmission techniques are employed. Time division communication systems and spread spectrum transmission are known in the art, particularly in military and other secure communications systems. In a typical TDMA system, each user transmitter is provided with a spread spectrum receiver that monitors a synchronizing transmission from a base station. The synchronizing signal informs the user transmitter when to transmit so as not to interfere with the other transmitters in the system. Reception of such synchronizing transmissions adds considerable cost and complexity to conventional TDMA systems. Further background concerning time division communication systems can be found in Chapters 15 and 16 of Taub & Schilling, *Principles of Communication Systems* (2nd Ed., 1986).

The introductory paragraphs on spread spectrum modulation in Chapter 17 of Taub & Schilling describes the technique and some of its characteristics as follows:

"Spread spectrum is a technique whereby an already modulated signal is modulated a second time in such a way as to produce a waveform which interferes in a barely noticeable way with any other signal operating in the same frequency band. Thus, a receiver [A] tuned to receive a specific AM or FM broadcast would probably not notice the presence of a spread spectrum signal operating over the same frequency band. Similarly, the receiver [B] of the spread spectrum signal would not notice the presence of the AM or FM signal. Thus, we say that interfering signals are transparent to spread spectrum signals and spread spectrum signals are transparent to interfering signals.

To provide the 'transparency' described above the spread spectrum technique is to modulate an already modulated waveform, either using amplitude modulation or wideband frequency modulation, so as to produce a very wideband signal. For example, an ordinary AM signal utilizes a bandwidth of 10 kHz. Consider that a spread spectrum signal is operating at the same carrier frequency as the AM signal and has the same power $P_s$ as the AM signal but a bandwidth of 1 MHz. Then, in the 10 kHz bandwidth of the AM signal, the power of the second signal is $P_s \times (10^4/10^6) = P_s/100$. Since the AM signal has a power $P_s$, the interfering spread spectrum signal provides noise which is 20 dB below the AM signal."

Further background concerning spread spectrum techniques can be found in Chapter 17 of Taub & Schilling.

SUMMARY OF THE INVENTION

A communication system in accordance with the invention employs a broadcast signal for synchronization of the transmitters and receivers in the system without use of a special base transmitter for synchronizing signal transmissions. Each transmitter having a preassigned time slot counts from a synchronizing index which is inherent in or added to the broadcast signal to determine when to transmit. The receiver or receivers similarly count from the synchronizing index to determine when to look for specific time slice transmissions.

DETAILED DESCRIPTION

Our preferred embodiment is illustrated by a financial quotation and order system with one base and many users. Generally, the base station transmits financial information to all of the subscribers who each have the ability to place action orders by transmitting them to the base. In this system, the financial information includes securities price quotations and the action orders include buy and sell type of orders.

In this system, the transmission link from base to user carries publicly available information which is encrypted because of its commercial value. Cost of the user equipment must be minimized. Therefore, in this embodiment, the financial information is transmitted in the vertical blanking interval (VBI) of a television broadcast. Encoding the base-to-user information into the television broadcast is well known in the art. The Packet 31 method is employed in this system.

Figure 2:
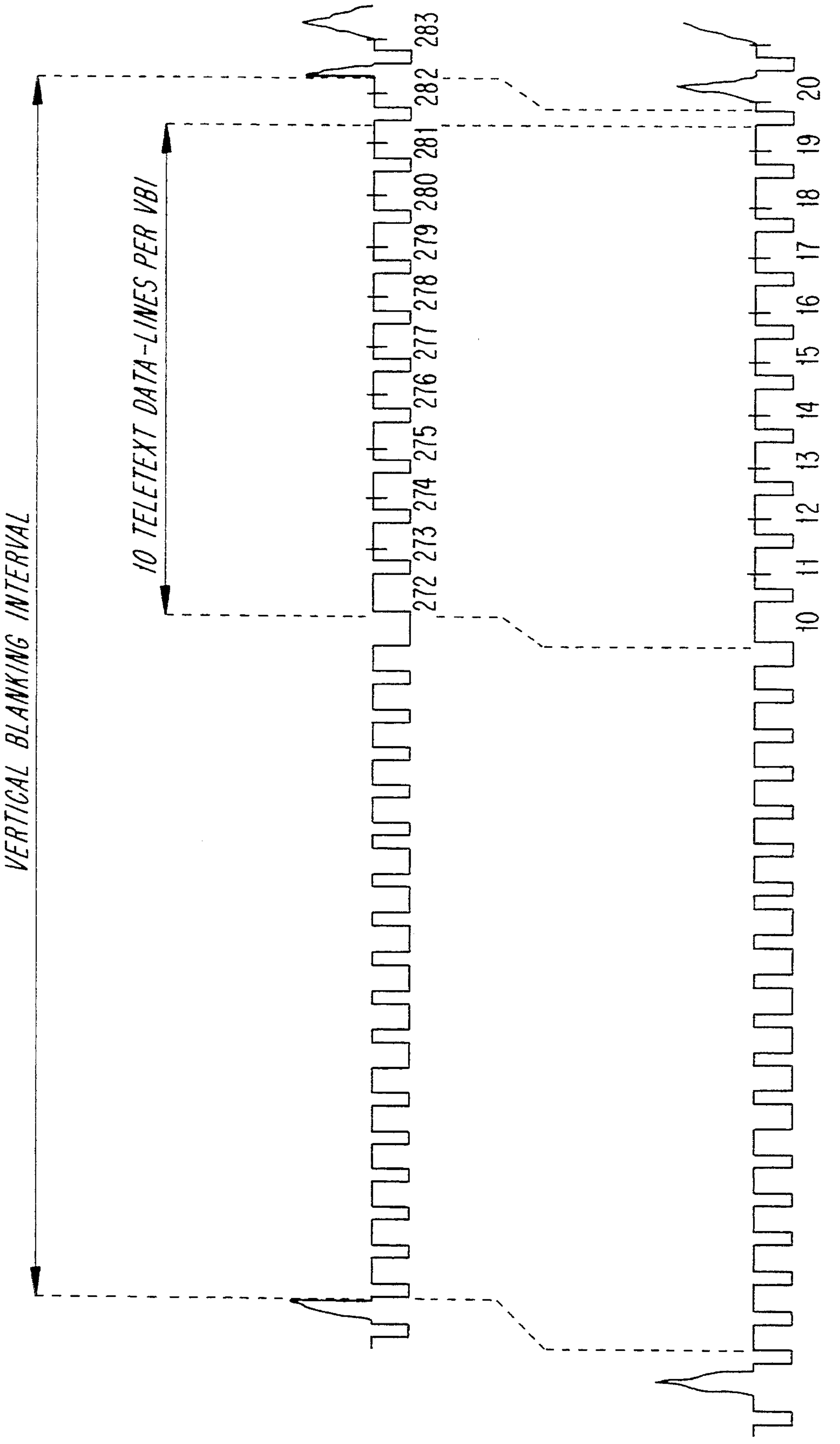
FIG. 2 is a representation of the vertical blanking interval portion of a TV broadcast signal showing the line numbers designated for carrying information in one system using the invention.

The Packet 31 system is a protocol standard in which 20 horizontal lines each carry 31 packets of information during the VBI. The twenty lines which have been designated to carry the teletext information are shown in FIG. 2 in relation to the VBI of an American System. The details of the Packet 31 protocol are set forth in "World System Teletext and Data Broadcasting System (CCIR Teletext System B) Technical Specification" February 1990 currently available from Bernard J. Rogers, Folly Farm, School Street, Woodford Halse, Dayentry, Northhamptonshire NN11 6RL U.K. An American standard has been approved by the Electronic Industries Association, is set forth in EIA-516, Joint FIA/CVCC Recommended Practice for Teletext: North American Basic Teletext Specification (NABTS), May 1988, and is currently available for $30.00 from EIA, Engineering Department, 2001 Eye St., N.W., Washington, D.C. 20006. The financial information as well as other base to user information is transmitted in this manner. It will be appreciated that the number of lines will be a function of the local television or broadcast systems. For example, a 625 line system is used in Europe.

Because of the nature of the users' action orders, the return link must be secure from error and jamming. For these reasons and because joint non-interfering use of the spectrum is important for commercial viability, spread spectrum (SS) transmission is preferred. To reduce the base equipment requirements and because the return channel data bandwidth is very small, a time division multiple access (TDMA) system is employed in the return link. The base can then use a single receiver for a great number of users. In a typical system there are up to 5,000 users and a single base.

Figure 1:
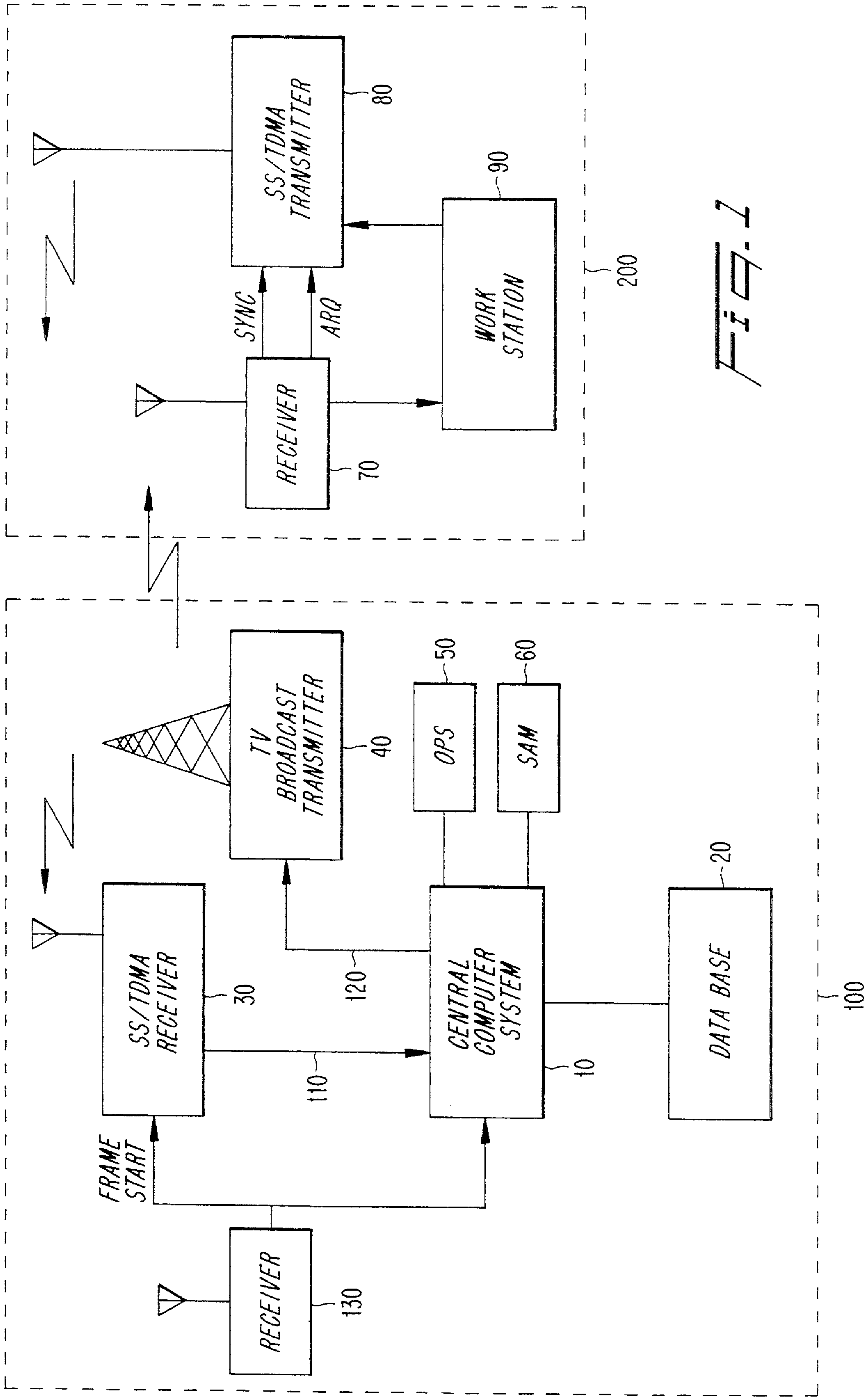
FIG. 1 is a block diagram overview of a communication system using the invention.

Referring to FIG. 1, the operation of this embodiment of our invention will be described in the context of this security quotation and order action system. The central computer system 10 supplies financial information to the conventional TV broadcast transmitter 40 from the data base 20 or other sources (not shown). Communication from the base 100 and to all of the users 200 is provided using the VBI of the TV broadcast signal. The central computer 10 also receives all of the user action orders from the SS/TDMA receiver 30. The central computer 10 then relays or acts upon the orders as necessary. The operation console (OPS) 50 is used to report on and maintain the integrity of the overall system. The administration console (SAM) 60 is used to control the level of service to each user.

Although not shown in FIG. 1, many broadcast transmitters and SS/TDMA receivers may be serviced by a single central computer system. Either or both of the SS/TDMA receiver 30 and the broadcast transmitter 40 may be remotely located from each other or the central computer system 10. In such systems, link 120 and link 110 may be long distance communication channels employing any suitable medium such as fiber optics, telephone, satellite, microwave according to system considerations such as distance, security, channel bandwidth, and the like.

The central computer 10 generates periodic synchronization signals which are transmitted by the TV broadcast transmitter 40 for synchronizing all of the user stations 200. This synchronization ensures that each user transmits in the correct time slot and eliminates the need for a separate SS receiver in each of the user transmitters. Alternatively, the synchronization signals may be generated at the broadcast transmitter 40. A broadcast receiver 130 is provided for supplying a frame start signal to the base receiver 30 (discussed below) and also to the central computer system 10. Alternatively, a direct connection from the broadcast transmitter can supply the timing signals. The synchronization will be discussed more fully below.

In the event that a user transmission is not properly received by the base, the central computer 10 generates a request for re-transmission of that user's data. The request for re-transmission (called ARQ for automatic repeat request) includes a user identification number which thus addresses a single user. This feature enhances the reliability of and the confidence in the system. In addition to an ARQ addressed to a single user station, a general ARQ to which all user stations would respond may be provided. Similarly, an ARQ specifying a range of user numbers may be provided to have many users in contiguous time slots re-transmit. Finally, the base may transmit a predetermined number of ARQ's to trigger an alarm at the user stations or to ensure that all users are on-line. It will be apparent to those of ordinary skill in the art that many special characters may be defined which can be used for a variety of messages or to trigger events at the user stations.

Also shown in FIG. 1 is a single user station 200. The user receiver 70 receives the TV broadcast signal and decodes the financial information which is stored and displayed in the work station 90. The user receiver 70 also decodes the synchronization and request for retransmission signals which it then provides to the user transmitter 80. User transmitter 80 upon cue from the user receiver 70 either transmits new user data (or status) or repeats the previous transmission during the user's preassigned time slot.

TDMA Synchronization

One feature of our invention uses the TV broadcast signal for synchronization of the TDMA radio link. The horizontal and vertical timing pulses from the TV broadcast are used to provide the synchronization and timing. There are 15,734 horizontal timing pulses per second in the broadcast signal. In order to provide a 1 mS time slot, each time slot is defined as a period consisting of 16 horizontal pulses. This provides a 1.0169 mS time slot.

In this system, up to 5,000 users must be accommodated by a single base receiver, providing a maximum cycle time of 5,000×1.0169 m or 5.08453 seconds. (Each user may transmit a 1 mS message every 5 seconds.) This 5 second period is greater than the period of any periodic signal feature naturally occurring in the standard TV broadcast. A synchronizing signal is therefore provided in the VBI of the base transmission. This synchronization signal provides an index from which all user receivers 200 begin counting horizontal timing pulses.

As an example, consider a user station 200 which has been designated as user number 12, that is the user must transmit only during the 12th time slot. The receiver 70 continuously monitors the vertical blanking portion of the TV broadcast in accordance with the Packet 31 standard. Upon receipt of the synchronization signal, the receiver begins counting the horizontal timing pulses (HTP). The receiver can begin counting HTP immediately after receipt of the synchronization character or wait until a predetermined signal feature occurs. For example, the receiver could wait until the vertical synchronization signal until it begins counting. The first 16 HTP's define the 1st time slot, HTP nos. 17 through 32 define the 2nd time slot, and so on. Upon receipt of HTP no. 177, the receiver signals to the user transmitter 80 to begin transmitting. The 192nd HTP signals the end of the twelfth time slot.

The base periodically retransmits the synchronization signal to ensure that the system stays synchronized. In this embodiment, the synchronization signal is transmitted each system cycle (number of time slots multiplied by the time slot duration). It is preferred, but not necessary, that the system cycle is an integral number of vertical blanking intervals. Therefore, the number of time slots (users) or the time slot duration may be adjusted slightly to fit.

It will be appreciated that, if the system cycle were reduced to fit within a single video frame, i.e., less than or equal to the video frame refresh rate (30 Hz in the United States), then the VBI can be used as the synchronization signal without any modification of the TV broadcast signal. By using the inherent characteristics of the TV broadcast, synchronization and timing operations could be further simplified.

The User Transmitter

Figure 3:
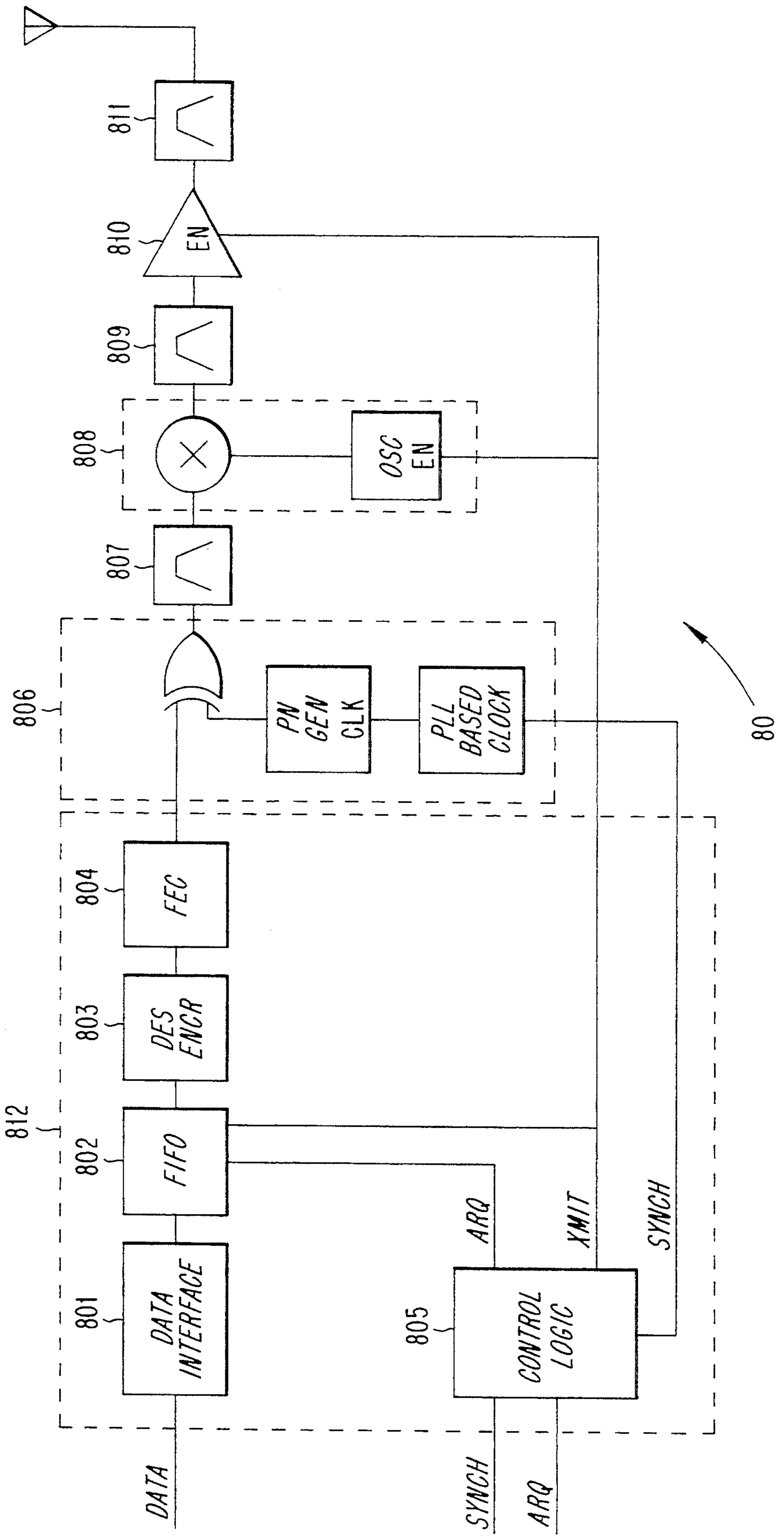
FIG. 3 is a block diagram of a subscriber transmitter for use in the communication system of FIG. 1.

The function of the user transmitter 80 in FIG. 1 is to accept data locally from the work station and transmit it at the proper time to the base. Referring now to FIG. 3, the operation of the user transmitter will be described. Data from the work station is accepted and stored in the FIFO 802 over the data interface 801 which provides the handshaking signals necessary for communication with the work station. The interface between the work station and the transmitter in this system is a RS232 or RS422 type standard. The FIFO 802 outputs the data in the order in which it was received to the encryption circuit 803 upon command from the control circuit 805. The digital encryption system (DES) 803 adds approximately a 25% overhead to the data which will force a increase in the data rate for a fixed message length in a fixed duration time slot. The DES standard promulgated by the National Bureau of Standards for use by all government agencies (other than in highly secure channels) is preferred because it is readily available in a chip set.

The control circuit 805 commands the FIFO to begin outputting data when the specific user time slot occurs, i.e., when the start transmit signal is received from the user receiver (70 in FIG. 1). Of course, various implementations are possible in which data may be encrypted prior to transmission and stored in a second FIFO or buffer. The FIFO 802 in this system stores the most recently transmitted data also. In the unlikely event that an ARQ is received, the control circuit 805 instructs the FIFO 802 to output the previously transmitted data instead of new data waiting in the FIFO. The remainder of the ARQ transmission operation is the same as a normal user transmission.

After encryption, the data is further encoded by the Forward Error Correction (FEC) encoder 804. The FEC encoding adds an additional 400% overhead which requires a quadrupling of the encrypted data rate. In our system, the final data rate after encryption and FEC encoding is approximately 400 K bits per second (Kbps).

The currently preferred method is to use an FEC code which is proprietary to SCS Telecom 85 Old Shore Road, Suite 200, Port Washington, N.Y. 11050. The SCS Code is a projection type FEC code which is very efficient. The FEC projection code has been the topic of a number of papers including "A new Burst and Random Error Correcting Code: The Projection Code" Gary R. Lomp and Donald L. Schilling, presented at the I.E.E.E. International Symposium on Information Theory, San Diego, California, January 1990. The use of the encoder and encryptor greatly reduces the bit error rate of the system particularly when combined with the ARQ system.

After the FEC encoder, the data is sent to the spread spectrum modulator 806 which, in this system, spreads the data using a pseudo noise (PN) sequence length of 127 chips and chip rate of 24 MHz. All users are assigned the same PN sequence for simplicity. A band pass filter 807 removes all of the components except the main lobe from the spread signal.

The spread signal is then up-converted to 2.5 GHz by multiplier 808 and filtered by the filter 809. The output of filter 809 is connected to gate 810 which is used to switch the transmitter on and off. Another bandpass filter 811 follows gate 810 to filter out unwanted harmonics that may be caused by switching of gate 810 before the signal is amplified and sent to the antenna for transmission.

Figure 5:
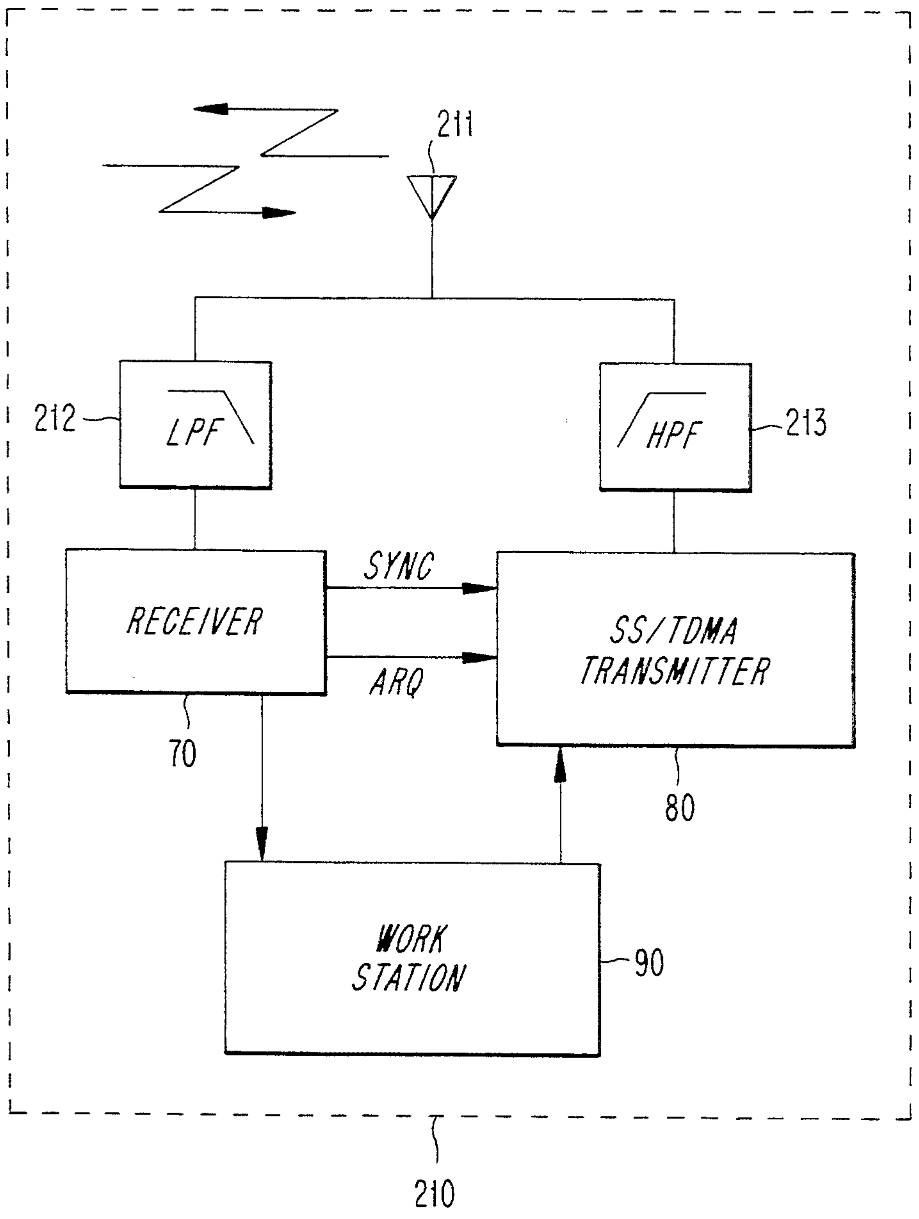
FIG. 5 is a block diagram of a modified user station 210 using a single antenna 211.

Referring to FIG. 5, a modified user station 210 is shown. Although shown separate in FIG. 1, the antenna feeding receiver 70 and the antenna being driven by transmitter 80 may be combined into a single antenna 211 as shown in FIG. 5. Because the highest TV signal will be around 0.8 GHz and the transmitter is operating at 2.5 GHz in this system, the two signals can be economically filtered from each other. A low pass filter 212 or band pass filter (not shown) may be placed between the receiver 70 and the antenna 211 to remove the user transmitter signal.

Such a single user antenna 211 can either be a standard TV unit or be specially fitted with additional elements tuned to the user transmitter frequency (2.5 GHz in this system). If a standard TV antenna is used, an impedance matching network (not shown) or a high pass filter 213 may be required. Greater transmitting efficiency can be obtained from the antenna by adding the tuned elements.

The use of a common antenna for the user receiver and transmitter is particularly advantageous when the base receiver antenna is located at the same place as the broadcast transmitter antenna. In addition to eliminating the need for an additional transmitter antenna, the antenna will be aimed toward the broadcast transmitter antenna. The typical directional characteristics of the antenna will benefit the transmitter also.

The SYNCH and ARQ signals from the receiver are used by control circuit 805 to control timing operations in the transmitter 80. The control circuit 805 enables the FIFO 802 to output new data or previously transmitted data as appropriate. The control circuit also enables and disables the 2.5 GHz upconverter 808 and the gate 810 using the timing signals to ensure that the transmitter only transmits during the user's preassigned time slot. For simplicity and to enhance base receiver acquisition of the user signal, the PN generator 806 is set to start at a predetermined point in the PN sequence at the beginning of each transmission, i.e., at the beginning of each time slot.

The transmitter implementation in this system is cost driven due to the large number of units required. Therefore, our transmitter is a stand alone peripheral utilizing a common interface 801 based upon the RS232 standard to connect to the work station. Many of the individual process steps shown in box 812 in FIG. 3 can be performed by a microprocessor since the user is only transmitting 80 bits of data every 5 seconds. If the data arrives at the microprocessor shortly before the user's time slot leaving insufficient time for the encoding and encryption, the data will be held for transmission until the user's next time slot.

The Base Receiver

Figure 4:
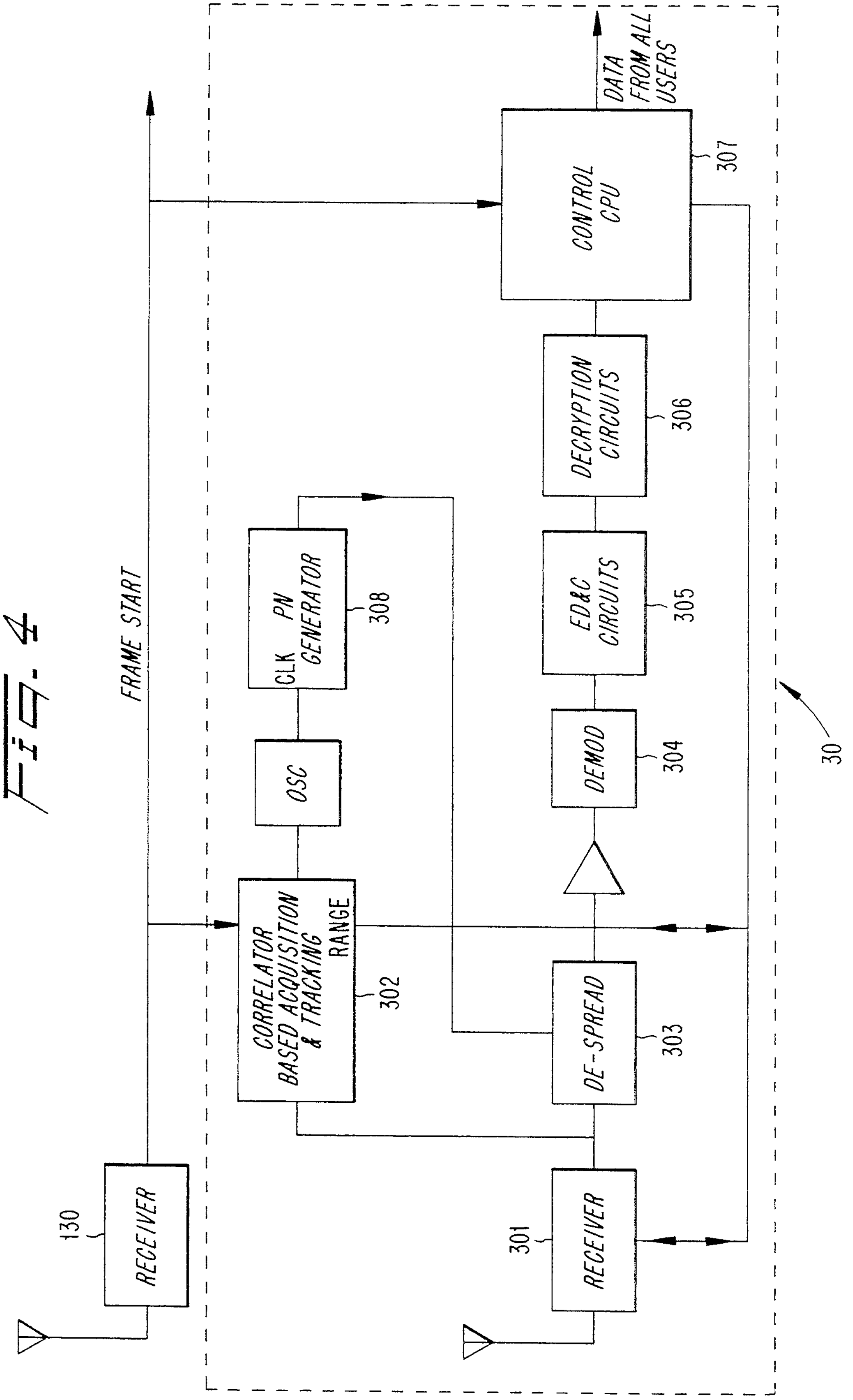
FIG. 4 is a block diagram of a base receiver for use in the communication system of FIG. 1.

Referring now to FIG. 4, the base receiver 30 will be described. The base receiver 30 is a single TDMA unit that services 5,000 users, i.e., receives all of the data from all of the users. The separated data is then sent to the central system 10 (shown in FIG. 1). As mentioned earlier in connection with the user antenna, the base receiver and broadcast transmitter may optionally share the same antenna providing the same options and benefits described earlier.

The received signals are processed in a classical spread spectrum manner. The RF signal from the antenna is amplified by a low noise microwave receiver 301 whose IF output drives the acquisition and tracking circuits 302. The acquisition and tracking circuits lock onto the user signal during each time slot synchronizing the PN generator 308 in the base receiver with the PN generator 806 of the user's transmitter. The output of the PN generator 308 is then mixed with the IF output of the microwave receiver 301 to de-spread the spread spectrum signal. After the IF signal is de-spread, it is amplified and demodulated yielding the encrypted FEC encoded signal. The original user data is recovered after sequentially passing through the error detection and correction circuits 305 and then the decryption circuits 306.

Because each user can be situated anywhere from several hundred feet to many miles from the base, the signal strength of each user will vary at the base. Additionally, each user's transmission will be somewhat delayed from the start of its respective time slot due to propagation delays. Such characteristics are troublesome in a TDMA system having small time slots because much of the time slot will be wasted on acquisition of each user. Each user signal is quickly acquired in this system by "tuning" the base receiver 30 to each user in the following manner.

The base receiver 30 uses range information supplied by the control CPU 307 to adjust the gain of the RF receiver and the propagation delay for synchronizing the acquisition and tracking circuits. This information is initially determined as each user is acquired into the system and, and updated periodically. In the preferred system, the information is updated during each user time slot. The control CPU 307 maintains the information in its memory.

The beginning of each user time frame is indicated by the frame start signal provided to the control CPU 307 and the acquisition and tracking circuit 302. The frame start signal supplies a timing reference to the base receiver 30 for determining when each user frame occurs. This timing reference is very similar to the SYNCH signal the user stations use to transmit and it can be similarly derived using a broadcast receiver.

A broadcast receiver 130 used for this purpose will differ from receiver 70. The receiver 70 produces a SYNCH signal which indicates the start of a specific user time slot. In contrast, the base receiver requires a frame start signal at the beginning of every user frame. Thus a frame start signal will be produced marking every user time slot (every 16 HTP) rather than a single user's time slot (eg. time slot number 12 during HTP nos. 177 through 192 as used in the example above). Alternatively, a direct connection between the television transmitter and the base receiver can supply the timing signals to the base receiver which can then produce the frame start signal.

By using the same fundamental timing signals (the HTP in the transmitted waveform) in the base receiver 30 and in each user station 200, the entire system will stay synchronized even in the event that timing pulses are missing from the transmission. For example, when the video content of the transmission is switched from one source to another discontinuities in the normal HTP or the VBI periods may result. The discontinuities will not affect system synchronization because all user stations and the base are using the transmitted waveform.

A small guard band at each user frame boundary is provided to allow for variation in propagation delays amongst the user stations. During the guard band portion of each time slot, the control CPU 307 provides the microwave receiver 301 with the appropriate gain information which is used to adjust the receiver gain for that user. The control CPU also provides the acquisition and tracking circuits 302 with the propagation delay information for that particular user. In response to the propagation delay information, the acquisition and tracking circuit waits a corresponding period of time after the start frame signal is received to begin looking for the respective user's PN sequence. In this way, the user signal is acquired very quickly because the base receiver knows almost precisely when and precisely at which point in the PN sequence the user's transmission will begin.

During the user time slot, adjustments to the gain and delay are made automatically by the receiver 301 and the tracking circuit 302 through their respective closed loop systems (AGC and DLL). These adjustments are monitored by the control CPU which updates the previously stored values.

If a user has not been acquired into the system, the values stored represent the last tried values used to try to acquire the user. The stored value is incremented and then used during the user's next time slot to try to acquire the user. In this way, the base receiver 30 searches for each user beginning with initial gain and delay values and incrementing each value until each user is acquired. The acquisition values are then stored and updated periodically as previously described.

Although shown as a separate circuit, either or both of the FEC decoder 305 and decryption circuit 306 functions may be performed by the control cpu 307 if sufficient processor time remains.

RF Protocol

To ensure proper communication over the SS/TDMA link, a simple protocol is used in this system. Referring to FIG. 5, a typical user time slot is shown. Each time slot is divided into two parts, one 0.2 mS and one 0.8 mS. During the 0.2 mS portion at the beginning of each time slot, each user transmits a pure PN signal. The base receiver uses this signal to acquire and track the user's signal. The remaining portion of the time slot is used to transmit data or status to the base. It is during this 0.8 mS period that the user transmits new data or retransmits previous data to the base.

The data may contain status information or action information. The status information may indicate either that the user is on line with no data to send or that its buffer is full. By always transmitting during its assigned slot (whether or not an action information is being sent), each user provides the base with a signal by which it may be acquired. Of course, this signal also provides the base with the opportunity to update the range information for each user.

One of ordinary skill in the art will appreciate that the synchronization aspect of our invention is not limited to TV broadcast signals. There are many different types of broadcast transmissions containing time base information which may be advantageously used to synchronize TDMA communication systems or any other type of communication system. One such broadcast is WWV, the National Bureau of Standards station which transmits one pulse per second with a missing pulse every minute. The WWV signal is particularly well suited to TDMA systems having a system cycle of one or more seconds up to one minute. TDMA systems having a system cycle of more than 1 second could resynchronize once every minute. Using a broadcast signal to synchronize a TDMA system is beneficial even if the broadcast signal contains no information specific to the system, i.e., even if the broadcast transmission is completely independent of the system. Of course, the system to be synchronized need not be a radio channel but can be a fiber optic or any other type of medium.

While there has been shown and described a particular arrangement of a communication system including a broadcast synchronized time division multiple access channel, it will be appreciated the invention is not limited thereto. Accordingly any modifications, variations or equivalent arrangements within the scope of the following claims should be considered within the scope of our invention.

We claim:

1. A communication system comprising:

a central processing station including an information source and a base spread-spectrum time-division-multiple-access (SS/TDMA) receiver, with adjustable gain and propagation delay for synchronizing with the communication system, operative to receive user data;

a television broadcast transmitter operatively connected to receive information from the central processing station and operative to transmit the information and horizontal and vertical timing pulses in a vertical blanking interval of a television broadcast;

one or more user stations with each user station including a television broadcast receiver operative to receive the television broadcast, a user transmitter operative to transmit user data, with the user transmitter having a Forward Error Correction (FEC) encoder for encoding the user data prior to transmission, and a single user antenna;

the user station being operative in response to the horizontal and vertical timing pulses to establish synchronization of the user transmitter with the communication system.

2. The communication system as set forth in claim 1, further comprising:

a plurality of television broadcast transmitters operatively connected to receive information from said central processing station.

3. The communication system as set forth in claim 1, further comprising:

a plurality of SS/TDMA receivers operative to receive user data.

4. The communication system as set forth in claim 1, wherein the SS/TDMA receiver is remotely located from said central processing station.

5. The communication system as set forth in claim 1 wherein the television broadcast transmitter is remotely located from said central processing station.

6. A broadcast synchronized return channel comprising:

a broadcast receiver for reception of information and horizontal and vertical timing pulses contained in a vertical blanking interval of a television broadcast signal using a Packet 31 standard, said broadcast receiver further including an encryption circuit;

a control circuit; and a Forward Error Correction (FER) encoder; a user transmitter operatively connected to the broadcast receiver for receiving horizontal and vertical timing pulses and information from the broadcast receiver and operative in response to counting the horizontal timing pulses to synchronize the transmissions with the horizontal timing pulses received by the broadcast receiver; and a single standard television antenna feeding the broadcast receiver and the user transmitter, having at least one of an impedance matching network and a high pass filter.

* * * * *

UNITED STATES PATENT AND TRADEMARK OFFICE

CERTIFICATE OF CORRECTION

PATENT NO. : 5,442,652

DATED : August 15, 1995

INVENTOR(S) : Allen G. Jacobson, et. al.

It is certified that error appears in the above-identified patent and that said Letters Patent is hereby corrected as shown below:

Title page, item [75] inventors: should be-- Allen G. Jacobson, Donald L. Schilling, and Kenneth J. Henrich--.

Signed and Sealed this

Third Day of October, 1995

Attest:

BRUCE LEHMAN

Attesting Officer

*Commissioner of Patents and Trademarks*